July 5, 1932.  S. J. LIACOS  1,866,413
TELEVISION
Filed April 28, 1931   3 Sheets-Sheet 1
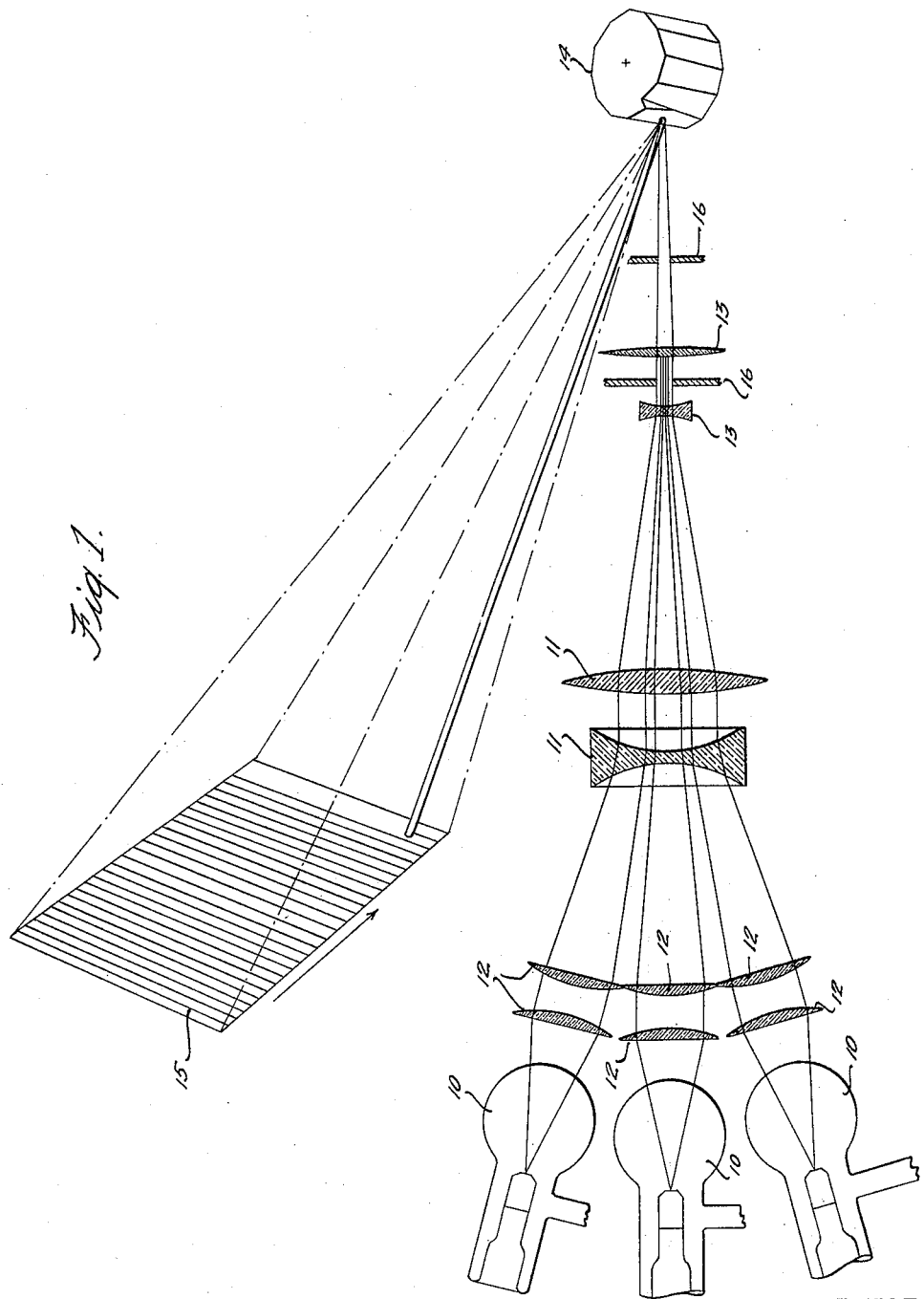
INVENTOR
STAVROS J. LIACOS
BY   ATTORNEY

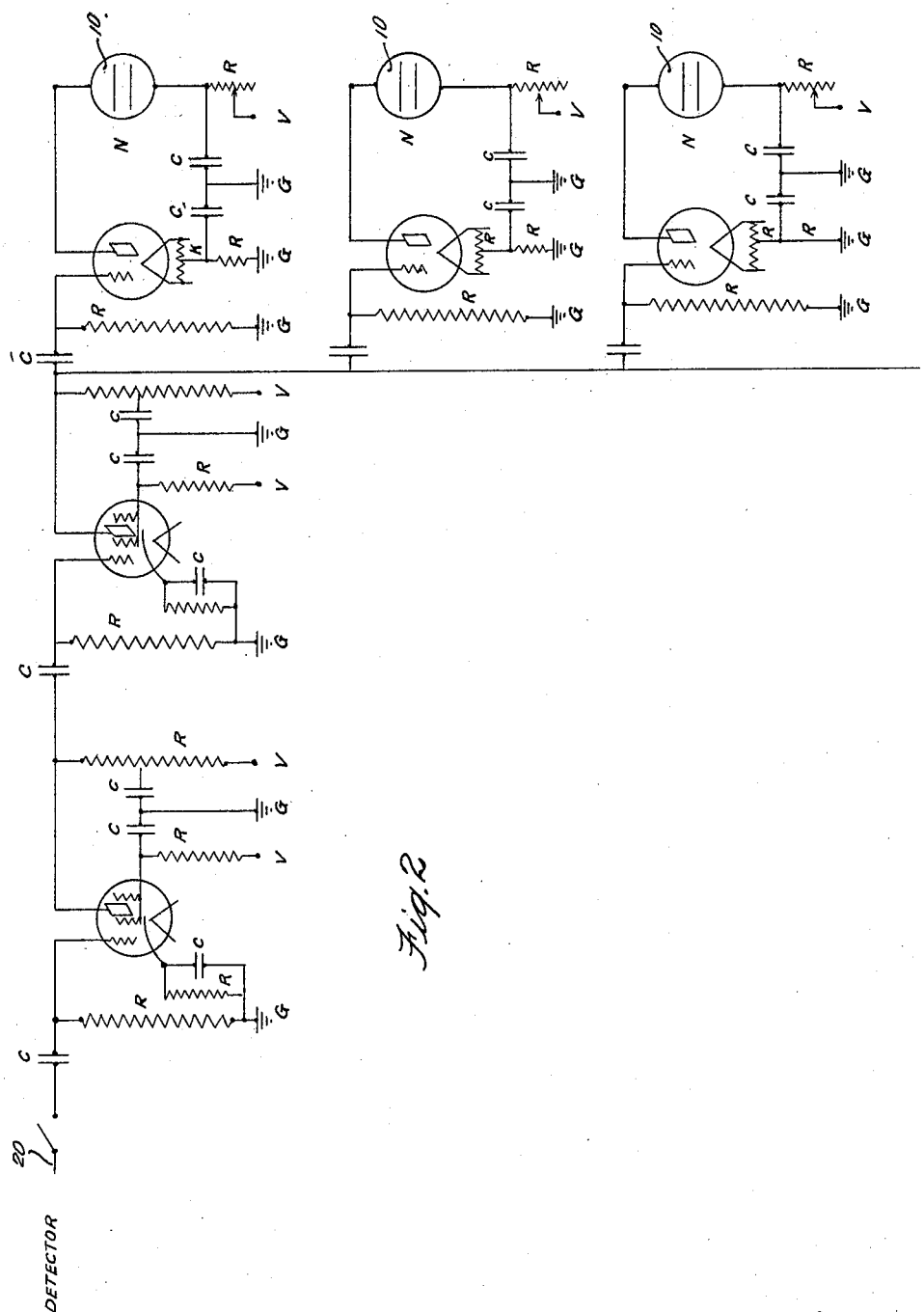

July 5, 1932.  S. J. LIACOS  1,866,413
TELEVISION
Filed April 28, 1931   3 Sheets-Sheet 3
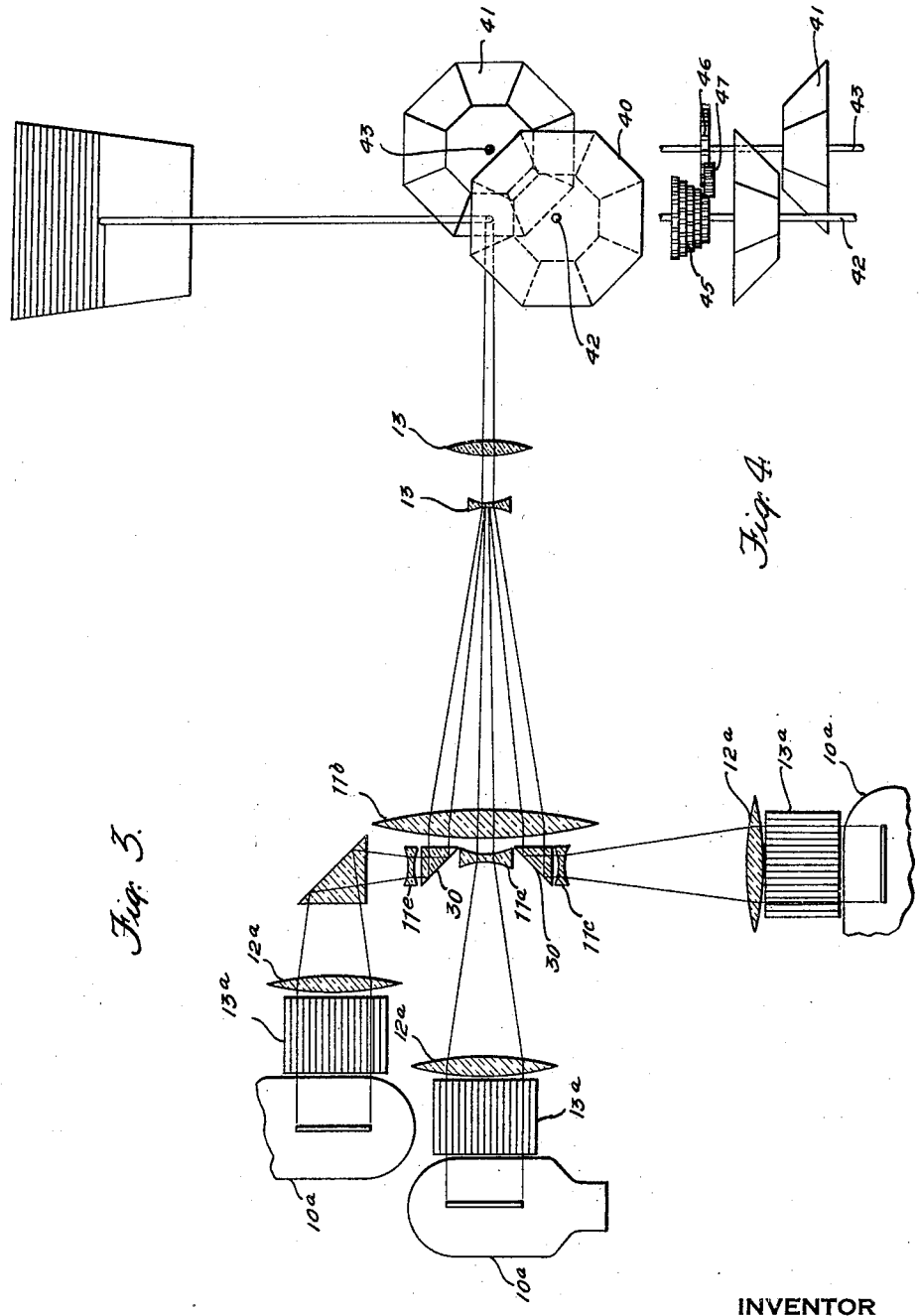
INVENTOR
STAVROS J. LIACOS
BY   ATTORNEY Patented July 5, 1932

1,866,413

UNITED STATES PATENT OFFICE

STAVROS J. LIACOS, OF BROOKLYN, NEW YORK

TELEVISION

Application filed April 28, 1931. Serial No. 533,405.

This invention relates to a method and a device for scanning, particularly the conversion of electrical signals into abundant light and scanning the said light into a visible image.

In the transmission of pictures, whether still or moving pictures, it is the usual practice to focus upon a light-sensitive element, such as a photo-electric cell, an image of a point which moves across an object of which the picture is to be transmitted. The path of this moving point ordinarily follows a series of closely spaced lines beginning at one corner of the space to be pictured and passing substantially parallel to one side on lines successively more distant, until the diagonally opposite corner is reached. As the point passes across areas which are lighter or darker, the intensity of the light falling upon the photo-electric cell becomes stronger or weaker, and thereby produces a stronger or weaker current in the circuit of said cell. This current, preferably after suitable amplification, may be transmitted by wire or radio, and, ordinarily after further amplification at the receiving end, is utilized to control the illumination of a light source, e. g., a special neon tube. The light from this source varies in intensity in substantially the same degree and time as the variations of intensity of the original scanning beam which falls upon the photo-electric cell at the transmitting station. This light is then converted into a concentrated beam which is moved across a screen, which may be a reflecting or translucent screen, e. g., ground glass, canvas, etc., or may be a light-sensitive screen such as a photographic plate. The movement of the beam is controlled so that its path follows a line or lines positioned on the screen in the same arrangement and of proportionate length and spacing to the arrangement, length and spacing of the lines of the original scanning at the transmitting station. The means for synchronizing the movement of the beam, i. e., the means for synchronizing the scanning apparatus at the receiving station with the scanning apparatus at the transmitting station, is well known, and forms no part of the present invention. If the scanning is done at such rate that the beam passes completely across the screen from corner to corner sixteen times per second, the effect will be that of a continuously illuminated visual image, and in this way, either still or moving pictures may be projected upon a screen at any distance from the original object or picture from which the reproduction signal is made.

Prior to my invention, images have been successfully produced upon a screen a few inches across. With larger images, however, the intensity of the light is so greatly dissipated that the image lacks satisfactory clearness. It has been impossible to increase satisfactorily the intensity of the light source because of the extreme rapidity with which its intensity must vary. Any light source which does not respond instantaneously to a change in the energizing current is substantially useless for this purpose, and the sources which have thus far been found practicable cannot be made to give any great intensities.

It has been suggested, prior to my invention, to scan the objective in sections, that is, to produce separately a series of pictures which would be fitted together upon the screen. This, however, involves duplication or multiplication many times of a large part of or the entire sending and receiving apparatus, and consequently involves expense which, for most purposes, would be prohibitive. My invention may, in some cases, replace such multiple channel system of reproduction, or may be combined with the multiple channel system for production of larger and/or brighter images.

It is an object of the present invention to make possible the reproduction of such images in larger size, amply illuminated, and to that extent more complete in detail. A further object of the invention is to make possible a more convenient arrangement of apparatus for the conversion of the electrical signals into the visual image. Other objects will be apparent from the following description.

In the accompanying drawings, I have shown illustrative embodiments of my invention.

Fig. 1 shows one preferred form of the invention, illustrating diagrammatically the optical elements and path of the light during the scanning.

Fig. 2 illustrates diagrammatically the circuits used for controlling the light sources by the electrical signal.

Fig. 3 illustrates another preferred form of the invention; and Fig. 4 shows a mirror wheel drive.

Referring to Fig. 1, I have indicated by the reference character 10 a series of neon tubes which, in this case, are shown as the new crater type tube, which produces a more concentrated illumination than the older plate type neon tubes. These tubes 10 are arranged with their "craters" directed toward a common lens 11. Between the lens 11 and the tubes 10, there is preferably a condensing lens, or systems of lenses 12, which condenses the divergent light from the crater of each neon tube into a converging beam, the beams from all of the tubes 10 converging toward a common point after their passage through the lenses 12. The lens or system of lenses 11 serves to extend somewhat the focus toward which the several beams of light are converging. While the lens or lens system 11 may not be necessary in every case, it is ordinarily desirable, because of the relatively wide angle at which the beams from the tubes 10 are converging. Another pair of lenses 13 converts the beam which is now concentrated within a very small area, to a beam in which the light is nearly parallel. Advantageously, as shown in the present instance, the beam is not quite parallel, but converges slightly toward the screen.

At one or more points along the path of the light, and preferably after it is concentrated into the narrow beam, a screen or screens 16 may be provided. These screens are made of opaque material, e. g., such as a dead black sheet material to avoid reflection, and each has a single aperture accurately fitted to the area of the beam. Thus, all stray light, that is, light which does not follow the prescribed course and would not be parallel in the final scanning beam, will be caught by the opaque screen and absorbed on its black surface.

A scanning device 14 moves the light of the concentrated beam across the screen 15 in parallel lines, as shown in the drawings. Many different devices may be used for effecting this movement of the beam of light across the screen 15. In the present instance, I have illustrated a mirror wheel in which a plurality of mirrors are placed about the periphery of the wheel, each being tilted slightly from the position of the last with respect to the axis of the wheel, so that as the wheel turns, the beam of light is moved across the screen by the turning of the mirror upon which the light is incident until the movement of the mirror wheel moves the first mirror out of the path of the beam of light. The second mirror then comes into play, but this, being at a slightly different angle, will throw the beam to a position slightly above or below the path followed by the reflection from the first mirror. As the wheel turns, the beam will describe a path parallel to the first path but slightly above or below it. Further turning of the wheel will bring a third mirror into play, and the beam will describe a third path slightly removed from the second, and further removed from the first. This continues until the opposite corner of the screen is reached, when the first mirror is again brought into play, and the beam is therefore returned to the first corner and will again describe successively the various paths corresponding to the various mirrors.

In Fig. 2 I have illustrated a circuit which may be used for the energizing of several lamps used for producing the scanning beam. In this case, the potential in the line 20 from the detector is amplified by conventional means, as shown. The details of this circuit will be immediately apparent to those skilled in the art from the accompanying diagram, Fig. 2. In this case, the signal impulse is first amplified through two stages, and the impulse thus amplified is transmitted by the line 21 to a plurality of subsequent stages of amplification connected thereto in parallel. Each of these parallel amplification circuits is connected to one of the tubes 10, and thus all are energized in response to the same signal impulse. It will be understood, of course, that the extent to which the amplification is in parallel is not essential to my invention, that is, the parallel portion of the circuit may include one or more stages of amplification, or the entire amplification may be connected in series and the lamps 10 connected in series or parallel in the final stage of the amplification circuit. At the opposite extreme, the entire reception may be in parallel, that is to say, independent detectors and independent amplification may be used for each of the lamps 10. The significant fact is that all of the lamps 10 are energized in response to the same signal impulse, and consequently will vary in unison.

In Figs. 3 and 4, I have illustrated another preferred embodiment of my invention. In this case, I have illustrated the neon plate tubes 10a of the more conventional type used ordinarily in television apparatus. In this case, also, instead of the apertured opaque screens 16, I have used the honeycomb gratings 16a, having light-absorbing surfaces. The effect of these honeycombs is to absorb all of the light passing between the neon tubes 10a and the lenses 12a, except the light which is parallel to the optical axis of the lenses 12a.

In this case, also, I have illustrated an arrangement by which a greater number of lights may be arranged about a common lens 11b. Thus, the light from one lamp or from a plurality of lamps, e. g., as illustrated in Fig. 1, may be condensed directly by lens 11a, while the light from one or a plurality of lamps arranged upon or about the axis of each of the lenses 11c are positioned radially around the lens 11a, either as shown at the top of Fig. 3, or as shown at the bottom of Fig. 3, or both as shown in that figure. The lenses 11a and 11c serve to convert the converging beams from the lenses 12a into beams of parallel light. The resulting beams from the lenses 11c are then reflected, e. g., by means of the prisms 30, so that when they fall upon the lens 11b, they are parallel to its axis, or otherwise symmetrical to its axis so as to be converted by the lens 11b, as shown. Although it is not entirely essential that the lenses 11c convert the beam into one of parallel light, this is desirable, particularly where the reflecting prisms 30 are used, in order to avoid reflection and refraction in the passage through the prisms. Furthermore, prisms having the reflecting face at an angle other than 45 may be used, but in any case the faces of the prism at which the light enters and leaves the prism should be perpendicular to the incident and to the reflected beams, respectively.

Beyond the lens 11b, the light may be treated as shown in Fig. 1, or in any other manner which will cause it to describe the successive paths across the screen required for the scanning. In Fig. 3, I have shown a novel improved means for effecting the change of ratio required for the scanning. In this case, instead of the mirror wheel 14, I have provided a pair of mirror wheels 40 and 41, mounted upon parallel shafts 42 and 43. One of these shafts is driven by any desired power connection controlled in the usual manner, so as to synchronize it with the scanning at the transmitting station. The other of the shafts is driven from the first through a change speed device, which in the present instance is shown as of a conventional type having a number of gears 45 of varying sizes fixed to one shaft and a solar gear 46 and a planetary gear 47 slidable axially upon the other shaft, so that they may be moved into line with any of the fixed gear and the planetary gear may be moved circumferentially into engagement with whatever one of said gears it is axially aligned. The various gears 45 are of sizes, compared with the gears 46 and 47, such that they provide speed ratios between the wheels 40 and 41 corresponding to the scanning ratios of the various transmitting stations.

In the operation of this scanning device, the wheel 41, upon which the beam of light is first incident, is driven slowly while the wheel 40, to which the light is reflected from the mirrors of the wheel 41, rotates much more rapidly. In this arrangement, the movement of the wheel 41 serves gradually to move the beam of light from the top to the bottom of the mirrors on the wheel 40, and thus gradually to cause the beam to move downward across the screen, or vice-versa. The mirror wheel 40, on the other hand, rotating rapidly, moves the beam rapidly across the screen from left to right, or vice-versa. As each successive mirror on the wheel 40 comes into play, the mirror on the wheel 41 has moved sufficiently to cause the path of light described by movement of this new mirror to be spaced slightly in a vertical direction from the path described by the previous mirror, and this continues until the corner of the screen is reached, when another mirror on the wheel 41 comes into play, and the scanning is again begun at the diagonally opposite corner.

Since the mirrors on both the wheels 40 and 41 are symmetrically arranged and have the same angle, there is no necessary starting point, and any desired scanning ratio may be obtained merely by changing the speed relation between the shafts 42 and 43.

The use of the truncated regular polyhedron mirror wheels permits the incident beam to be reflected in a perpendicular direction, and avoids the difficulty experienced in the prior art of arranging other parts of the apparatus so as to avoid interference with the scanning beam. Furthermore, the use of such mirror wheels permits them to be mounted upon parallel adjacent shafts, and thus avoids all complicated gearing, and permits such direct variable speed in the connection, as is illustrated in Fig. 4 of the drawings. Although it is most desirable to use the truncated regular polyhedron, as shown in the drawings, this is not essential, and e. g., the mirror wheels need not be truncated, and for certain special effects the polyhedron need not have a regular polygonal base. I have used the word "pyramidal" herein to describe these mirror wheels, regardless of whether or not they are truncated, and regardless of the particular base polygon of the pyramid, and regardless of the base angle thereof. It is even possible, in some cases, to utilize a concave pyramidal mirror wheel in which the mirrors are arranged in pyramidal relation to each other, but reflecting from their inner, instead of from their outer surfaces. Furthermore, where a special shape line in the scanning frame is required, the mirrors of the mirror wheel may be of a shape other than a plane surface, designed to produce the particular path required. Thus it is possible to duplicate the slightly curved lines produced by the common scanning disc, instead of the straight, or approximately straight, lines produced by the mirror wheels.

It will be understood from the above description that I have provided a novel scanning device for television, etc., in which light from a plurality of sources, energized in response to the same signal impulse, is combined into a single beam, and I have also provided means by which substantially the entire light energy from all of the lights may be concentrated in the point of light which is moved across the screen. In this way, I am able to produce visual images of almost any required size, amply illuminated, and to that extent without loss of clearness, and with detail as complete as in the smaller images which are possible with the apparatus heretofore known. It will be understood that many of the features shown in the drawings and described above, although they combine to produce an extraordinarily efficient result, are of advantage when used with other types of apparatus. Thus the concentrating of light from many sources into a single beam is of advantage, even with the common scanning disc in which a substantial part of the light beam is lost and the mirror wheel scanning device is of advantage even though used with a single light source, and without other features of my invention.

I have shown and thus far have described my invention as embodied in the combining of light from a plurality of similar sources merely to increase intensity. My invention is also applicable, however, for combining light from dissimilar sources, e. g., lights of different colors from lamp tubes filled with different gases, whereby to produce upon the screen a synthetic light approaching white light. My invention may also be combined with various known methods for producing images in color, especially since it makes practicable the use of color filters, which, with the reception apparatus as heretofore known, have absorbed so much of the limited amount of light as to be impractical.

Although I have shown in the drawings and described above preferred forms of my invention, and have suggested some modification thereof, I have not attempted to exhaustively describe the numerous changes and modifications which may be made within the scope of my invention. It is, nevertheless, intended that all such changes and modifications be included within the scope of this application. In the appended claims the expression "gaseous discharge lamps" is intended to define any light source in which the illumination is produced by an electrical discharge through a gaseous medium, whether it be a vapor of the electrode material or a different atmosphere of high or low pressure between the electrodes, so that the intensity of the illumination may follow faithfully the variations in intensity of the electrical discharge.

What is claimed as new is:

1. A device for producing light images from a variable electrical potential which comprises a plurality of gaseous discharge lamps, means responsive to said varying potential for controlling the intensity of light emitted by each of said lamps so that the intensity from all will vary simultaneously, means for concentrating said light from each lamp into a converging beam, means for condensing said beams into a single concentrated beam, and means for moving light of said beam over a predetermined path.

2. A device for producing light images, as defined in claim 1, which further comprises means for eliminating all light which does not follow the prescribed path of said beam.

3. A device for producing light images, as defined in claim 1, in which the means for moving light over a predetermined path is adapted to change the direction of said beam without substantially decreasing the amount of light therein.

4. A device for producing light images, as defined in claim 1, in which the means for moving light over a predetermined path comprises angularly moving reflecting means adapted to pass substantially the entire beam over the prescribed path.

5. A device for producing light images from an electrical signal which comprises means for receiving and amplifying said signal, a plurality of gaseous discharge lamps adapted quickly to respond by variation in light intensity to variation in strength of their energizing currents, the gaseous discharge lamps being connected to such amplifying means so that the intensity of light from each will vary simultaneously, means for concentrating the light from said lamps into beams converging toward a common focus, and common means for moving light of said consolidated beams across a screen over a prescribed path.

6. A device for producing light images, as defined in claim 5, which further comprises means near said focus for converting the converging beams into a single beam adapted to produce an intense spot of light upon a screen.

7. A device for producing light images, as defined in claim 5, which further comprises means for converting light from each of said lamps into a beam of substantially parallel light directed toward a common axis, and means close to said axis for bending each of said beams so that its light is directed substantially parallel to said axis, and means for concentrating the parallel light of all said beams into a common converging beam.

8. A device for producing light images, as defined in claim 5, in which the lamps are positioned radially about a common axis, and which includes means for concentrating light from each lamp into a beam directed toward a common axis, and reflecting surfaces arranged close to said axis adapted to bend said beams substantially parallel to said axis.

9. A device for producing light images, as defined in claim 5, in which the lamps are arranged radially about a common axis and the means for concentrating the light from said lamps includes lenses adapted to convert the light from each lamp into a beam of substantially parallel light, prisms close to said axis, each having a face perpendicular to the light of the beam from one of said lamps incident upon said face, another face perpendicular to said common axis, and a third face adapted to reflect the light passing through the first, and positioned so that a line perpendicular thereto bisects the angle between lines perpendicular to the other two faces, and a lens adapted to receive light from all of said prisms and to concentrate it into a single beam.

10. A device for producing light images, as defined in claim 1, in which the means for moving the light over a predetermined path comprises a mirror wheel.

11. A device for producing light images, as defined in claim 1, in which the means for moving the light over a predetermined path comprises a pair of mirror wheels arranged with respect to the incident light and to each other, so that the first, by its rotation, moves the beam of light across the mirrors of the other in a direction transverse to the direction of movement of the mirrors of said second wheel.

12. A device for producing light images, as defined in claim 1, in which the means for moving light over a predetermined path comprises a pair of pyramidal mirror wheels on parallel spaced axes, said mirror wheels being arranged with respect to the incident light and to each other, so that the first, by its rotation, moves the beam of light across the mirrors of the other in a direction transverse to the direction of movement of the mirrors of said second wheel.

13. A device for producing light images from a variable electrical potential which comprises a plurality of light sources, means responsive to said varying potential for controlling the light intensities from said sources so that all vary synchronously, means for concentrating light from all of said sources upon a screen, and means for moving said concentrated light together over the screen following a predetermined path so that the lights from all of said sources will always be concentrated upon a common moving spot.

14. An apparatus for moving a beam of light along a predetermined path, which comprises pyramidal mirror wheels mounted upon parallel adjacent shafts and driving connections between said mirror wheels adapted to fix their relative speeds of rotation.

15. An apparatus, as defined in claim 12, in which the driving connections include change speed connections adapted to permit any of a plurality of fixed speed ratios corresponding to the ratios used in scanning at a plurality of transmitting stations.

16. An apparatus for moving a beam of light along spaced parallel lines, which comprises a pyramidal mirror wheel arranged so that a beam of light reflected from its reflecting surface will be moved angularly, approximately in a single plane, by the rotation of said wheel, a second pyramidal mirror wheel arranged so that the plane of the reflected beam from the first wheel is radial to said second mirror wheel, and so that its reflecting surface is always sufficiently oblique to said beam reflected from the first wheel to cause the beam reflected thereby to escape from between said mirrors, and means for rotating said mirrors at a predetermined speed ratio.

17. An apparatus for moving a beam of light along spaced parallel lines, which comprises a pyramidal mirror wheel having its reflecting faces so related to the incident beam of light that, upon rotation of the wheel, they will move the reflected beam rapidly through an angle approximately in a plane parallel to the axis of rotation; a second pyramidal mirror wheel overlapping and inverted with respect to the first, and arranged so that said beam reflected from the first wheel falls upon a face of the second wheel which moves in a direction approximately perpendicular to the plane in which the beam is moved by the first wheel; and means for rotating said wheels at a predetermined speed ratio.

18. An apparatus, as defined in claim 17, in which the mirror wheels are mounted on parallel axes, and the reflecting faces of said wheels are at approximately 45° to their axes of rotation.

19. The method of producing light images which comprises energizing a plurality of gaseous discharge lamps so that all vary in intensity simultaneously in response to the same controlling signal, concentrating the light from said lamps into a single beam, and moving said beam across a screen at a rate and in a path corresponding to those chosen in making the control signal.

20. A method, as defined in claim 19, in which the beam of light is moved by changing the direction of the entire beam, thereby using throughout the formation of the image substantially the entire light of the combined beam.

Signed at New York, N. Y., this 27th day of April, 1931.

STAVROS J. LIACOS.